United States Patent
Klein et al.

(10) Patent No.: US 9,586,489 B2
(45) Date of Patent: Mar. 7, 2017

(54) BATTERY PACK DISCHARGING DEVICE AND METHOD FOR DISCHARGING A BATTERY PACK

(71) Applicant: LG Chem, Ltd., Seoul (KR)

(72) Inventors: Martin J. Klein, Grosse Pointe Park, MI (US); Mohamed Alamgir, Rochester Hills, MI (US); Daniel K. McNeill, Lake Orion, MI (US); Gary Nivelt, Clarkston, MI (US)

(73) Assignee: LG Chem, Ltd., Seoul (KR)

( * ) Notice: Subject to any disclaimer, the term of this patent is extended or adjusted under 35 U.S.C. 154(b) by 733 days.

(21) Appl. No.: 13/952,280

(22) Filed: Jul. 26, 2013

(65) Prior Publication Data

US 2015/0028695 A1    Jan. 29, 2015

(51) Int. Cl.

| H02J 7/00 | (2006.01) |
|---|---|
| B60L 11/00 | (2006.01) |
| B60L 3/00 | (2006.01) |
| B60L 3/04 | (2006.01) |
| B60L 11/18 | (2006.01) |
| H01M 10/44 | (2006.01) |

(52) U.S. Cl.
CPC ............ *B60L 11/00* (2013.01); *B60L 3/0046* (2013.01); *B60L 3/04* (2013.01); *B60L 11/005* (2013.01); *B60L 11/1864* (2013.01); *B60L 11/1874* (2013.01); *B60L 11/1879* (2013.01); *H01M 10/44* (2013.01); *H02J 7/0026* (2013.01); *B60L 2240/545* (2013.01); *B60L 2240/549* (2013.01); *H01M 2220/20* (2013.01);
(Continued)

(58) Field of Classification Search
CPC .................................. H02J 7/00; H02H 11/00
USPC .................................. 307/326; 320/127, 135
See application file for complete search history.

(56) References Cited

U.S. PATENT DOCUMENTS

| 5,594,314 A | 1/1997 | Hagiuda et al. |
|---|---|---|
| 5,808,444 A | 9/1998 | Saeki et al. |
| 6,291,973 B1 | 9/2001 | Lee |

(Continued)

FOREIGN PATENT DOCUMENTS

| JP | 2004282823 | 10/2004 |
|---|---|---|
| JP | 2008306818 | 1/2008 |

(Continued)

OTHER PUBLICATIONS

U.S. Appl. No. 13/827,830, filed Mar. 14, 2013 entitled Battery Pack Discharging Device and Method for Discharging a Battery Pack.
(Continued)

*Primary Examiner* — Jared Fureman
*Assistant Examiner* — Joseph Inge
(74) *Attorney, Agent, or Firm* — Buckert Patent & Trademark Law Firm, P.C.; John F. Buckert

(57) ABSTRACT

A battery pack discharging device having a hand-held member and a docking device are provided. The hand-held member has a handle portion, first and second extension members, first and second conductive members, and a resistor. The resistor is disposed in the handle portion between the first and second conductive portions. The device further includes a docking device having a housing and first and second contact members. The first and second extension members are disposed in the first and second apertures, respectively, of the docking device such that the first and second conductive members contact the first and second contact members, respectively.

10 Claims, 10 Drawing Sheets

(52) U.S. Cl.
CPC ........ *Y02T 10/7005* (2013.01); *Y02T 10/7022* (2013.01); *Y02T 10/7061* (2013.01)

(56) References Cited

U.S. PATENT DOCUMENTS

| | | | | |
|---|---|---|---|---|
| 8,466,659 | B2 * | 6/2013 | Shipp | A61B 17/34 |
| | | | | 320/135 |
| 2004/0257037 | A1 * | 12/2004 | Hartung | H01M 2/1022 |
| | | | | 320/114 |
| 2009/0009132 | A1 * | 1/2009 | Dym | A47J 27/004 |
| | | | | 320/127 |
| 2010/0320970 | A1 * | 12/2010 | Paczkowski | H01M 10/44 |
| | | | | 320/127 |
| 2011/0074339 | A1 | 3/2011 | Midorikawa | |
| 2013/0082663 | A1 * | 4/2013 | Mori | B60L 11/1842 |
| | | | | 320/135 |
| 2014/0266052 | A1 * | 9/2014 | Klein | H02J 7/0042 |
| | | | | 320/127 |

FOREIGN PATENT DOCUMENTS

| | | | |
|---|---|---|---|
| JP | 2012070577 | A | 4/2012 |
| KR | 19970047107 | U | 7/1997 |
| KR | 20060083133 | A | 7/2006 |
| KR | 20080099227 | | 11/2008 |
| KR | 20090113521 | A | 11/2009 |
| KR | 20100075952 | | 7/2010 |
| KR | 20120088120 | | 8/2012 |
| KR | 20130061018 | | 6/2013 |
| KR | 20130078879 | | 7/2013 |
| KR | 20130078879 | A * | 7/2013 |

OTHER PUBLICATIONS

Written Opinion for International application No. PCT/KR2014/002090 dated May 26, 2014.

* cited by examiner

BATTERY PACK DISCHARGING DEVICE AND METHOD FOR DISCHARGING A BATTERY PACK

BACKGROUND

Emergency responders may have to assist drivers in electric vehicles or hybrid electric vehicles, hereinafter referred to as electric vehicles. The inventors herein have recognized that it would be advantageous to have a battery pack discharging device that can be utilized by an emergency responder to safely discharge a battery pack in the electric vehicle or the hybrid electric vehicle.

SUMMARY

A battery pack discharging device for discharging a battery pack in accordance with an exemplary embodiment is provided. The battery pack discharging device includes a hand-held member having first and second conductive members and a resistor electrically coupled between the first and second conductive members. The battery pack discharging device further includes a docking station having a housing and first and second contact members disposed in the housing. The housing has first and second apertures extending therethrough. The hand-held member is configured to be at least partially disposed in the first and second apertures, respectively, of the housing such that the first and second conductive members contact the first and second contact members, respectively.

A method for discharging a battery pack in accordance with another exemplary embodiment is provided. The method includes providing a battery pack discharging device having a hand-held member and a docking device. The hand-held member has first and second conductive members and a resistor electrically coupled between the first and second conductive members. The docking station has a housing and first and second contact members disposed in the housing. The housing has first and second apertures extending therethrough. The method further includes disposing at least portions of the hand-held member in the first and second apertures, respectively, of the housing such that the first and second conductive members contact the first and second contact members, respectively.

DETAILED DESCRIPTION

Figure 1:
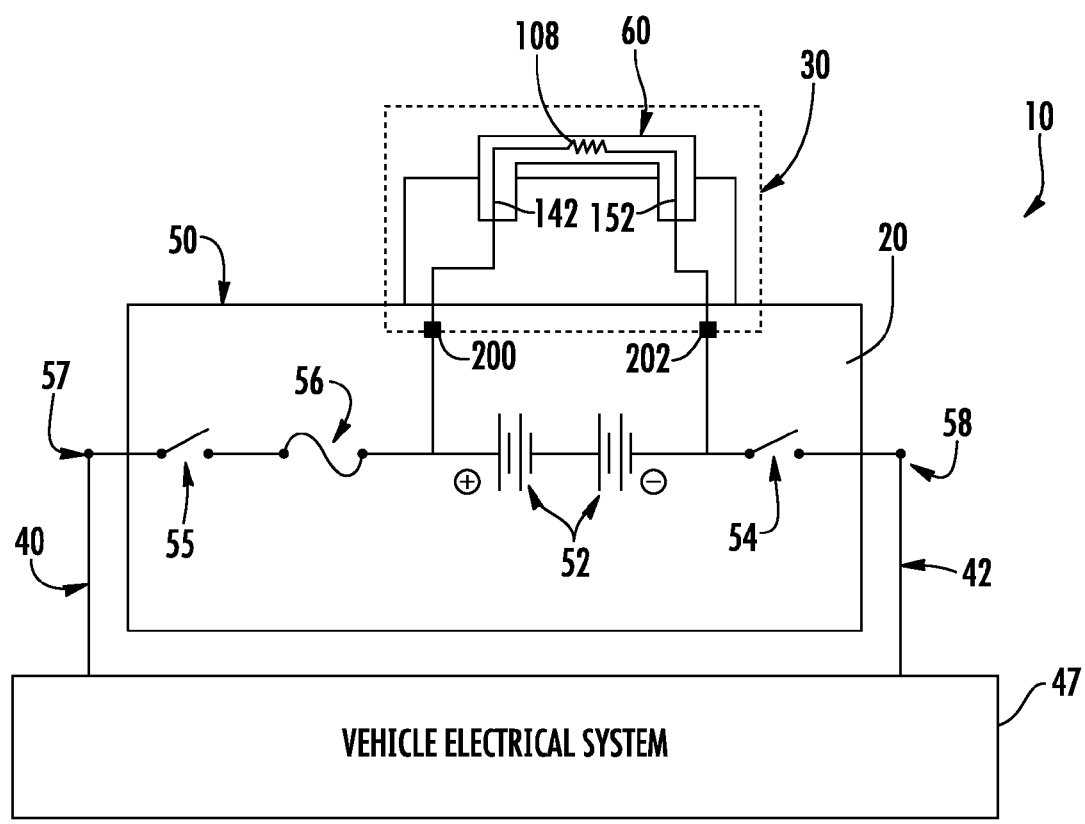
FIG. 1 is a schematic of an electric vehicle having a battery pack and a battery pack discharging device in accordance with an exemplary embodiment.

Referring to FIG. 1, an electric vehicle 10 is illustrated. The electric vehicle 10 includes a battery pack 20, a battery pack discharging device 30 in accordance with an exemplary embodiment, and electrical cables 40, 42.

The battery pack 20 is provided to store and release electrical energy for the electric vehicle 10. The battery pack 20 includes a housing 50, one or more battery modules 52, a positive voltage terminal 57, and a negative voltage terminal 58. In an exemplary embodiment, the battery pack 20 further includes a negative main contactor 54, a positive main contactor 55, and a main fuse 56. The battery modules 52 are disposed within the housing 50. The battery module 52 includes a positive voltage terminal and a negative voltage terminal. The positive terminal of the battery module 52 is electrically coupled to the positive voltage terminal 57 of the battery pack 20 when the positive contactor 55 has a closed operational position and fuse 56 is installed and functional. The negative terminal of the battery module 52 is electrically coupled to the negative voltage terminal 58 of the battery pack 20 when the negative contactor 54 has a closed operational position. In one exemplary embodiment, each battery module 52 is a lithium-ion battery module. Of course, in an alternative embodiment, each battery module 52 could be another type of battery module or ultra-capacitor known to those skilled in the art. The positive voltage terminal 57 is electrically coupled to the vehicle electrical system 47 utilizing the electrical cable 40, and the negative voltage terminal 58 is electrically coupled to the vehicle electrical system 47 utilizing the electrical cable 42

An advantage of the battery pack discharging device 30 is that the device 30 allows an operator to electrically discharge the battery pack 20 utilizing a single hand-held member 60 regardless of the status of the contactors 54, 55 and the fuse 56.

Figure 2:
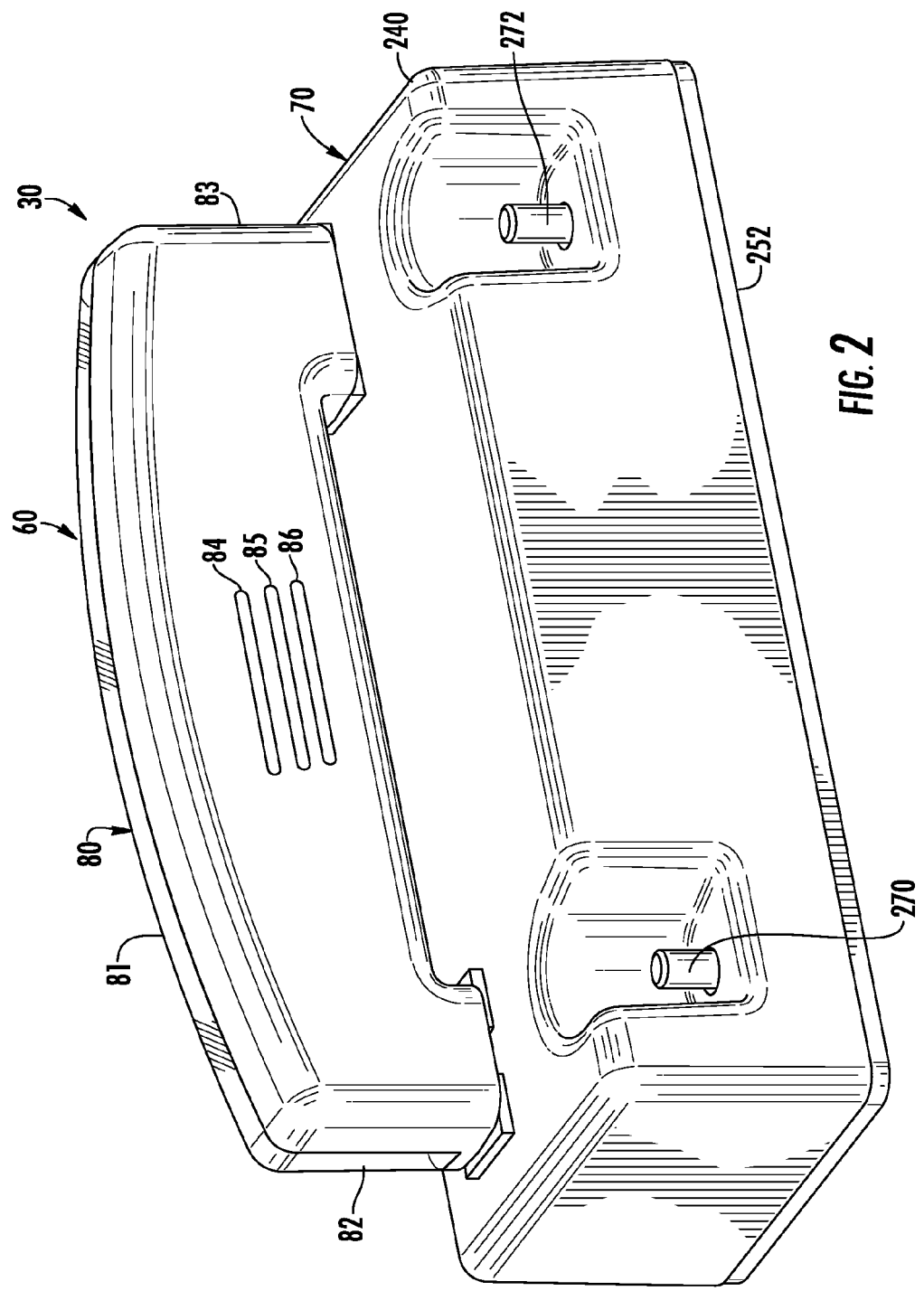
FIG. 2 is a schematic of the battery pack discharging device of FIG. 1 having a docking device and a hand-held member.
Figure 3:
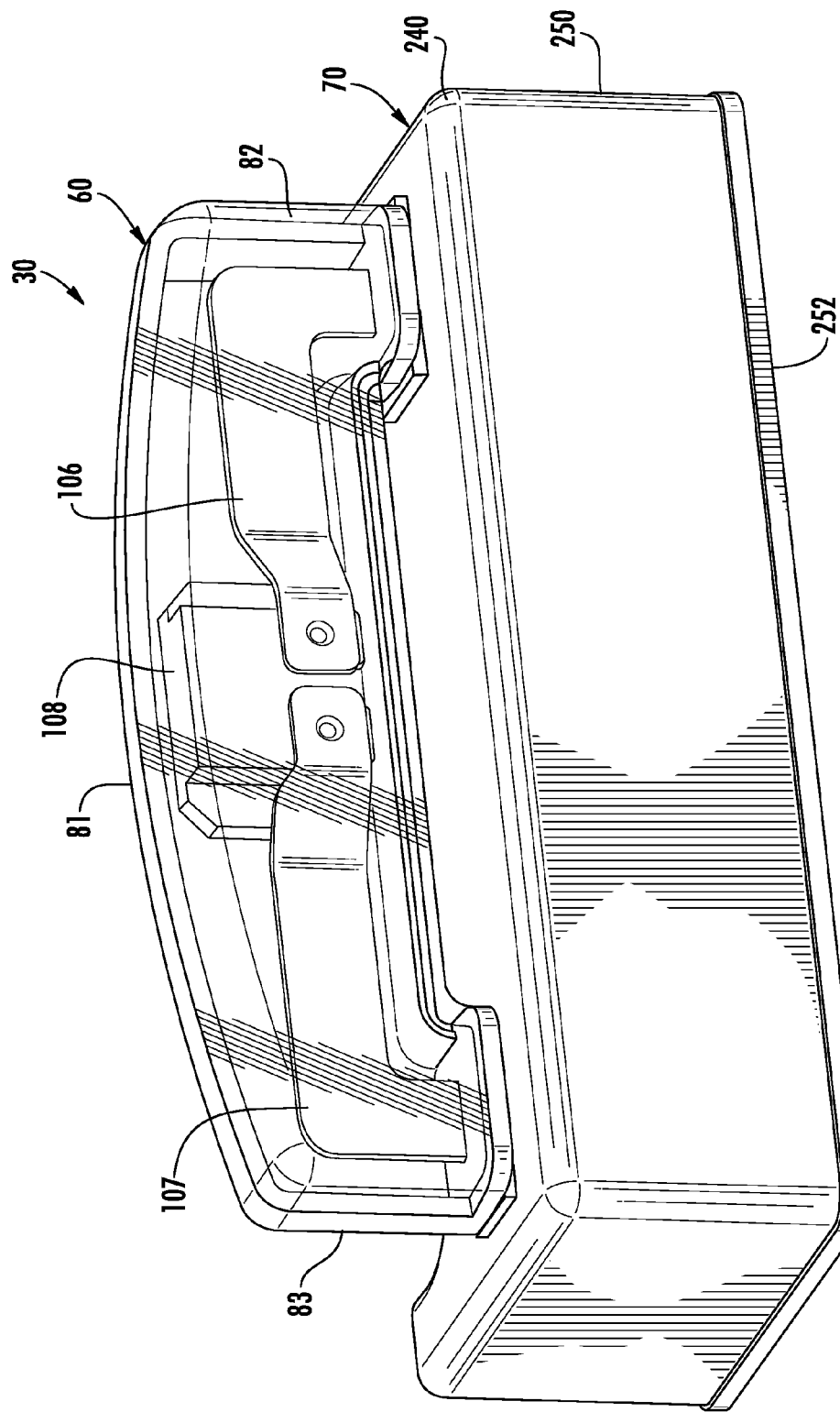
FIG. 3 is another schematic of the battery pack discharging device of FIG. 1 having a portion of the hand-held member shown transparently.

Referring to FIGS. 1 and 2, the battery pack discharging device 30 is provided to selectively discharge the battery pack 20. The battery pack discharging device 30 includes a hand-held member 60 and a docking device 70. The device 30 is electrically coupled to the positive and negative terminals of the battery modules 52 and electrically discharges the battery pack 20 when the hand-held member 60 is operably coupled to the docking device 70.

Referring to FIGS. 2-6, the hand-held member 60 is configured to be operably coupled to the docking device 70. In one exemplary embodiment, the hand-held member 60 is constructed of an electrically non-conductive material such as plastic for example. Of course, in alternative embodiments, the hand-held member 60 could be constructed of other electrically non-conductive materials known to those skilled in the art. The hand-held member 60 includes a handle portion 80 having a central body 81 and end portions 82, 83 disposed at opposite ends of the central body 81. The central body 82 has apertures 84, 85, 86 extending therethrough that allows airflow therethrough for cooling a resistor 108 within the central body 82. In an alternative embodiment, the number, size, and shape of the apertures within the central body 82 can be varied based on the desired heat dissipation of the resistor 108.

Figure 6:
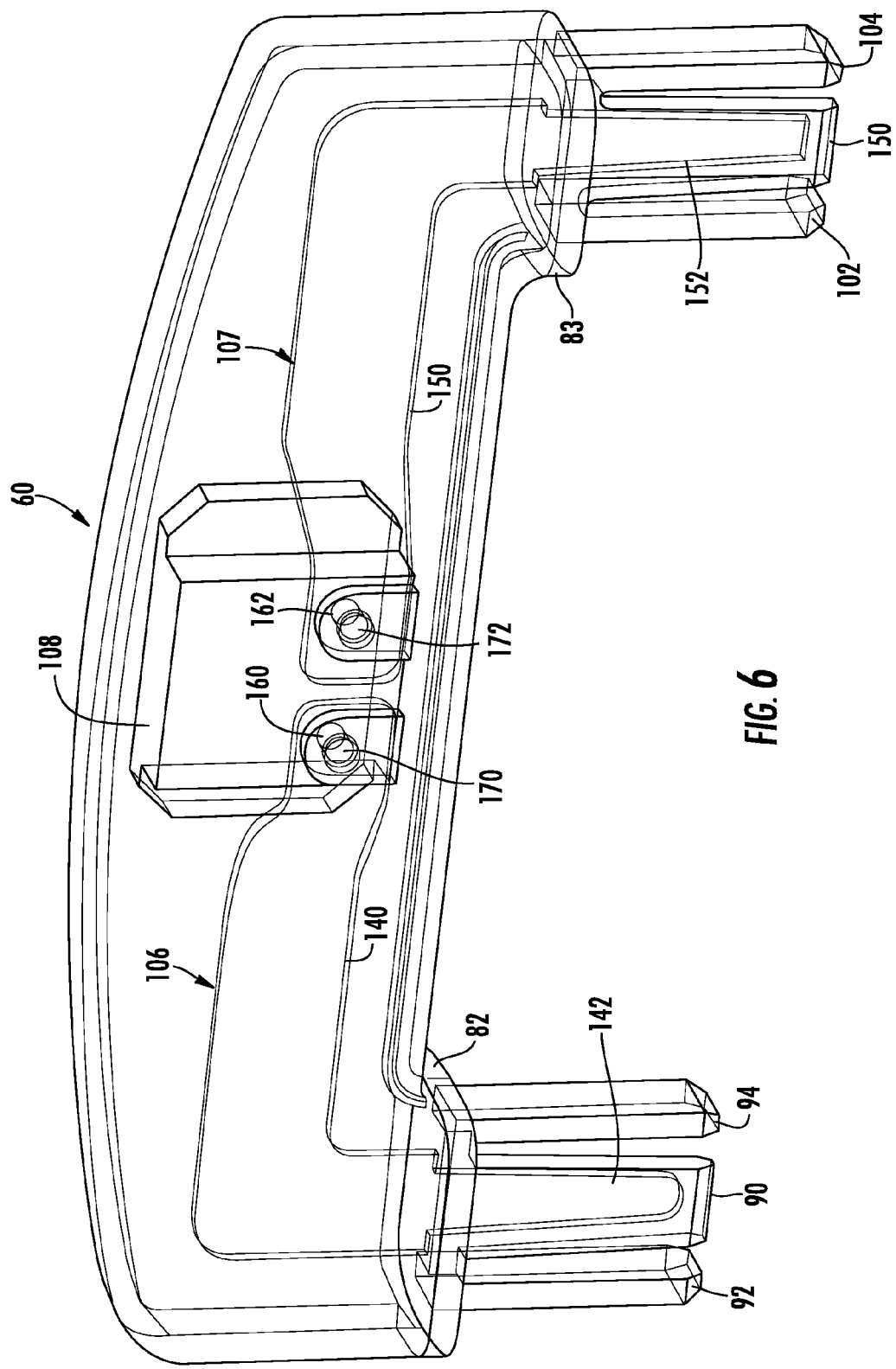
FIG. 6 is another schematic of the hand-held member of FIG. 2 shown transparently.

Referring to FIG. 6, the hand-held member 60 further includes an extension member 90, guide tabs 92, 94, an extension member 100, guide tabs 102, 104, conductive members 106, 107, and a resistor 108.

Figure 4:
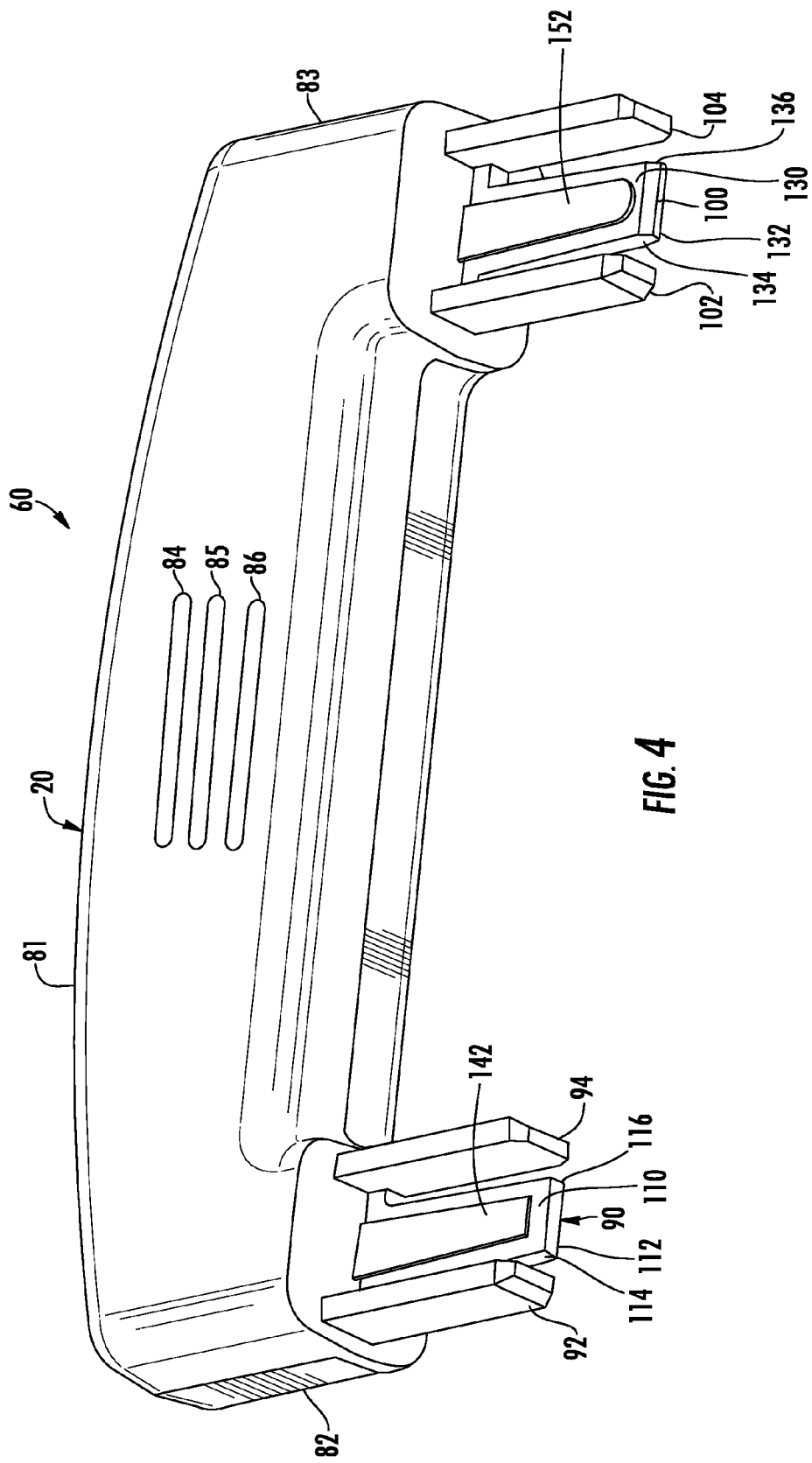
FIG. 4 is a schematic of the hand-held member of FIG. 2.
Figure 5:
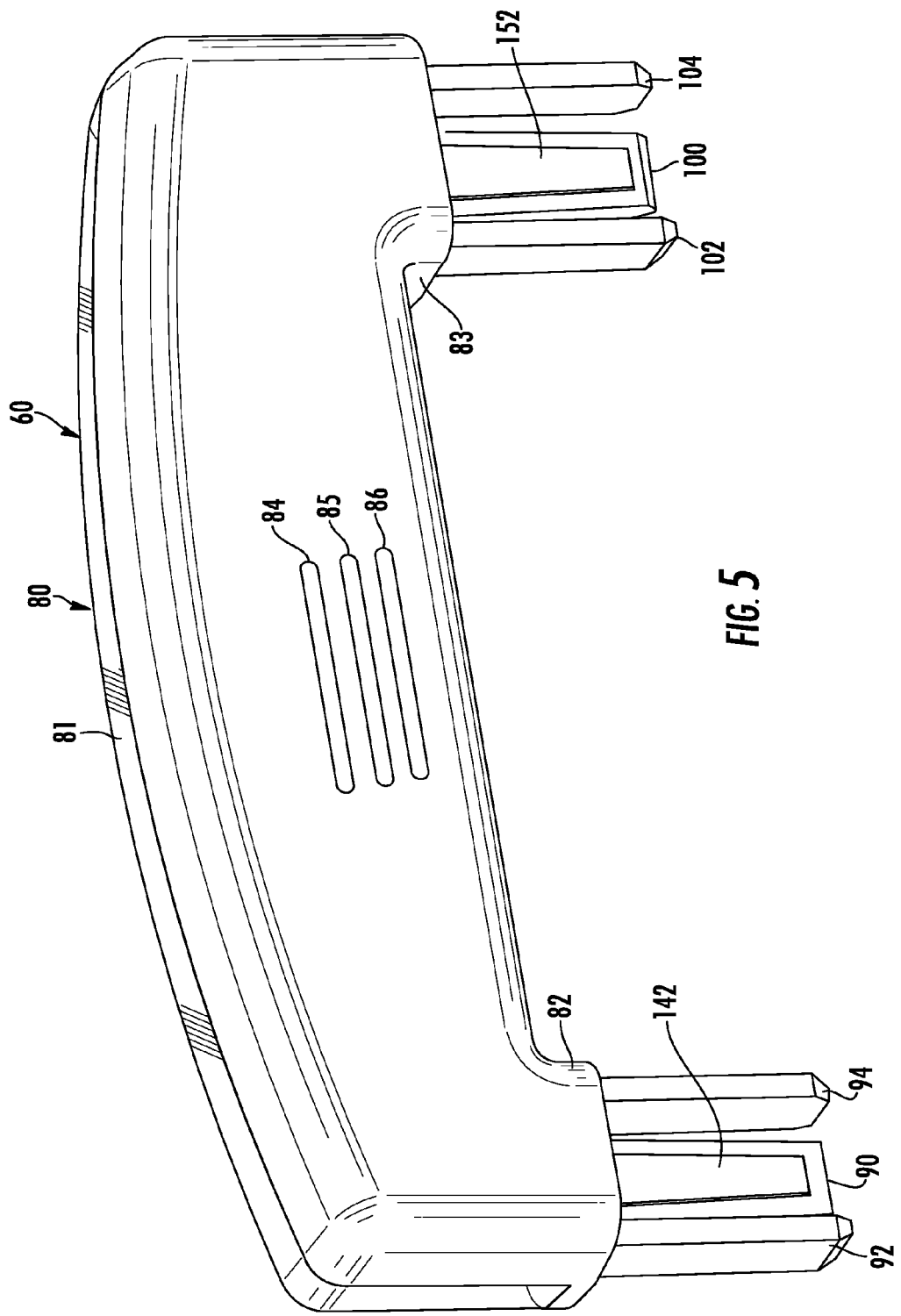
FIG. 5 is another schematic of the hand-held member of FIG. 2.

Referring to FIGS. 4-6, the extension member 90 extends in a first direction from the end portion 82 of the handle portion 80. The extension member 90 includes sides 110, 112, 114, 116. The side 110 and the side 112 are disposed opposite to one another. Similarly, the side 114 and the side 116 are disposed opposite to one another. The guide tabs 92, 94 extend in the first direction from the end portion 82 of the handle portion 80. The guide tabs 92, 94 are disposed proximate to the sides 114, 116, respectively, of the extension member 90.

The extension member 100 extends in a first direction from the end portion 83 of the handle portion 80. The extension member 100 includes sides 130, 132, 134, 136. The side 130 and the side 132 are disposed opposite to one another. Similarly, the side 134 and the side 136 are disposed opposite to one another. The guide tabs 102, 104 extend in the first direction from the end portion 83 of the handle portion 80. The guide tabs 102, 104 are disposed proximate to the sides 134, 136, respectively, of the extension member 100.

Referring to FIG. 6, the conductive member 106 has conductive portions 140, 142 coupled together. In one exemplary embodiment, the conductive portions 140, 142 are integrally formed with one another. The conductive portion 140 is electrically coupled to a first end of the resistor 108 and extends from the resistor 108 within the handle portion 80. The conductive portion 142 is disposed on the extension member 90.

The conductive member 107 has conductive portions 150, 152 coupled together. In one exemplary embodiment, the conductive portions 150, 152 are integrally formed with one another. The conductive portion 150 is electrically coupled to a second end of the resistor 108 and extends from the resistor 108 within the handle portion 80. The conductive portion 152 is disposed on the extension member 100.

The resistor 108 is disposed in the handle portion 80. In one exemplary embodiment, a resistance value of the resistor 108 is determined based on a maximum output voltage of the battery pack 20 and a maximum desired electrical current to be received by the battery pack discharging device 30 from the battery pack 20. The resistor 108 is configured to dissipate electrical energy from the battery pack 20 when the hand-held member 60 is operably coupled to the docking device 70. The resistor 108 has apertures 160, 162 extending therethrough for receiving pins 170, 172, respectively, therethrough. The pins 170, 172 are utilized to couple the resistor 108 to the conductive members 106, 107, respectively. In an alternative embodiment, the resistor 108 can comprise a plurality of resistive elements coupled together.

Referring to FIGS. 2, 3 and 7-9, the docking device 70 is configured to operably receive the hand-held member 60 therein. The docking device 70 includes a housing 240 having a housing portion 250 and a base plate 252. The docking device 70 further includes contact members 260, 262 and electrical terminals 270, 272. In one exemplary embodiment, the housing portion 250 and the base plate 252 are constructed of electrically non-conductive material such as plastic for example. Of course, in alternative embodiments, the housing portion 250 and the base plate 252 could be constructed of other electrically non-conductive materials known to those skilled in the art.

The housing portion 250 is configured to be disposed over the base plate 252 and the coupled to the base plate 252. The housing portion 250 includes apertures 290, 292 (shown in FIG. 7) extending therethrough. During attachment of the hand-held member 60 to the docking device 70, the extension member 90 and the guide tabs 92, 94 are configured to be disposed through the aperture 290. Further, during attachment of the hand-held member 60 to the docking device 70, the extension member 100 and the guide tabs 102, 104 are configured to be disposed through the aperture 292.

The base plate 252 is configured to support the housing portion 250 thereon. The base plate 252 includes a plate 300 and mounting brackets 310, 312. The mounting brackets 310, 312 are disposed on and coupled to a top side of the plate 300. The mounting bracket 310 is configured to support the contact member 260 and the electrical terminal 270 thereon. The mounting bracket 312 is configured to support the contact member 262 and the electrical terminal 272 thereon.

Figure 7:
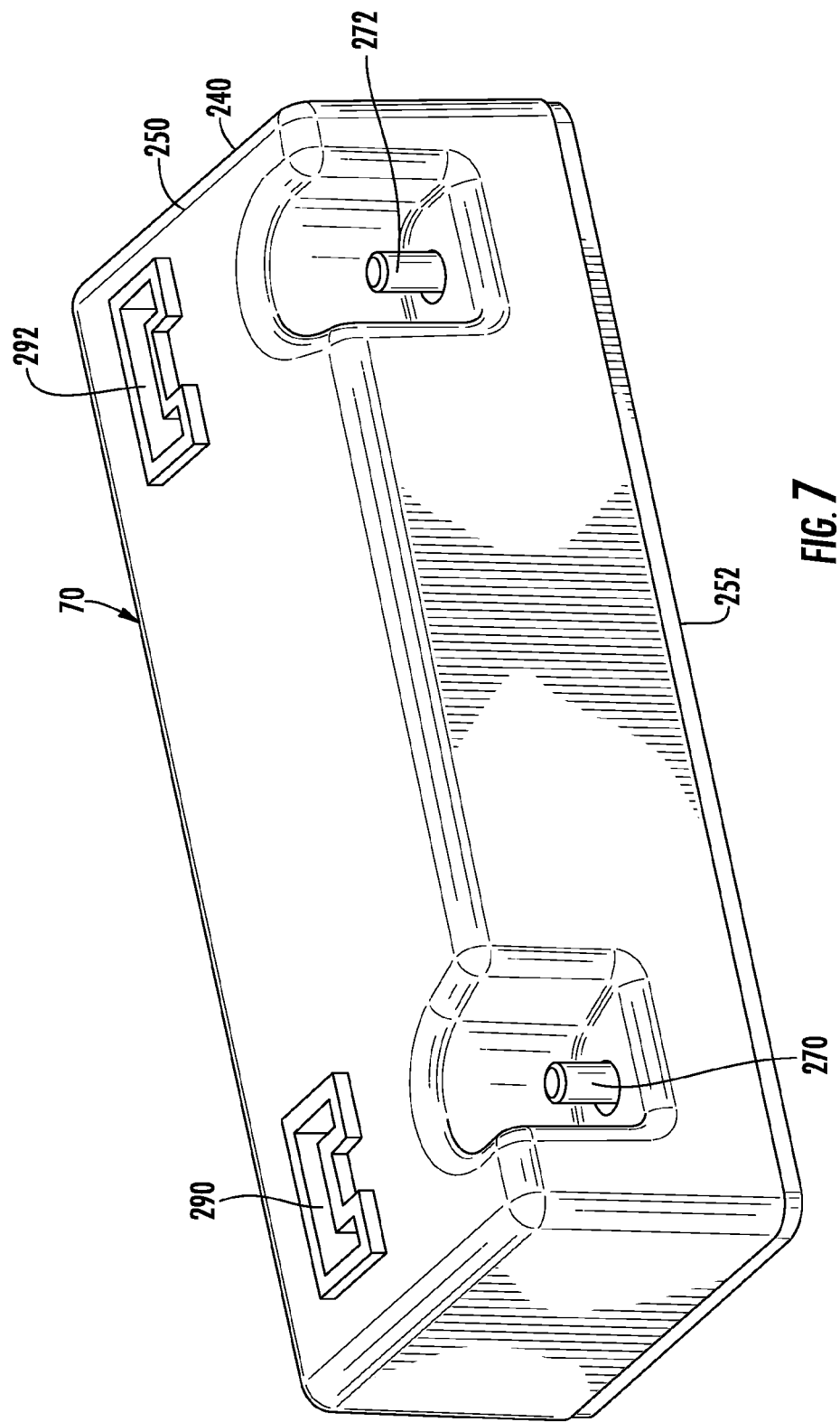
FIG. 7 is a schematic of a housing of the docking device of FIG. 2.
Figure 8:
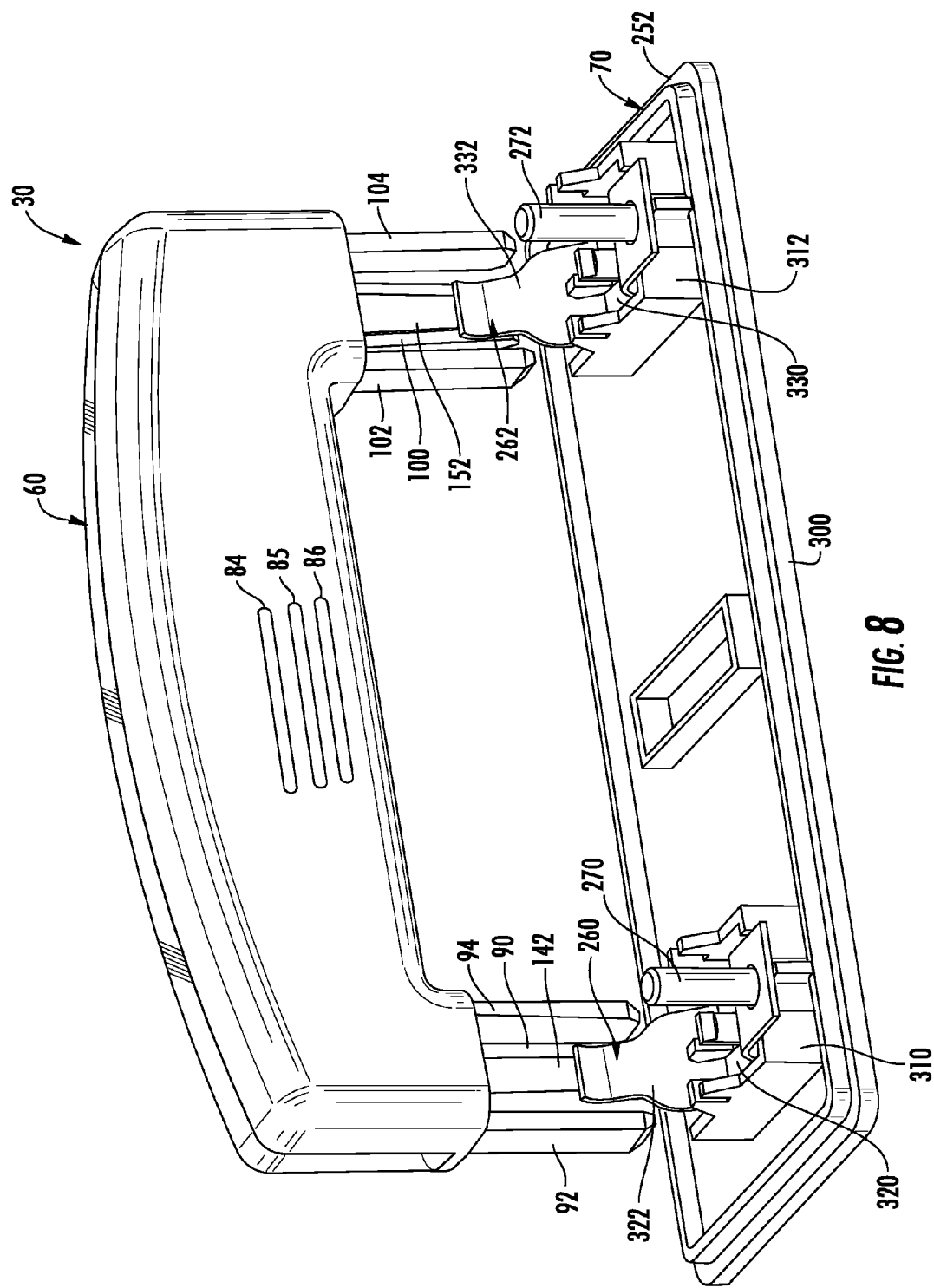
FIG. 8 is another schematic of the hand-held member operably coupled to contact members disposed on a base plate of the docking device of the battery pack discharging device of FIG. 1.
Figure 9:
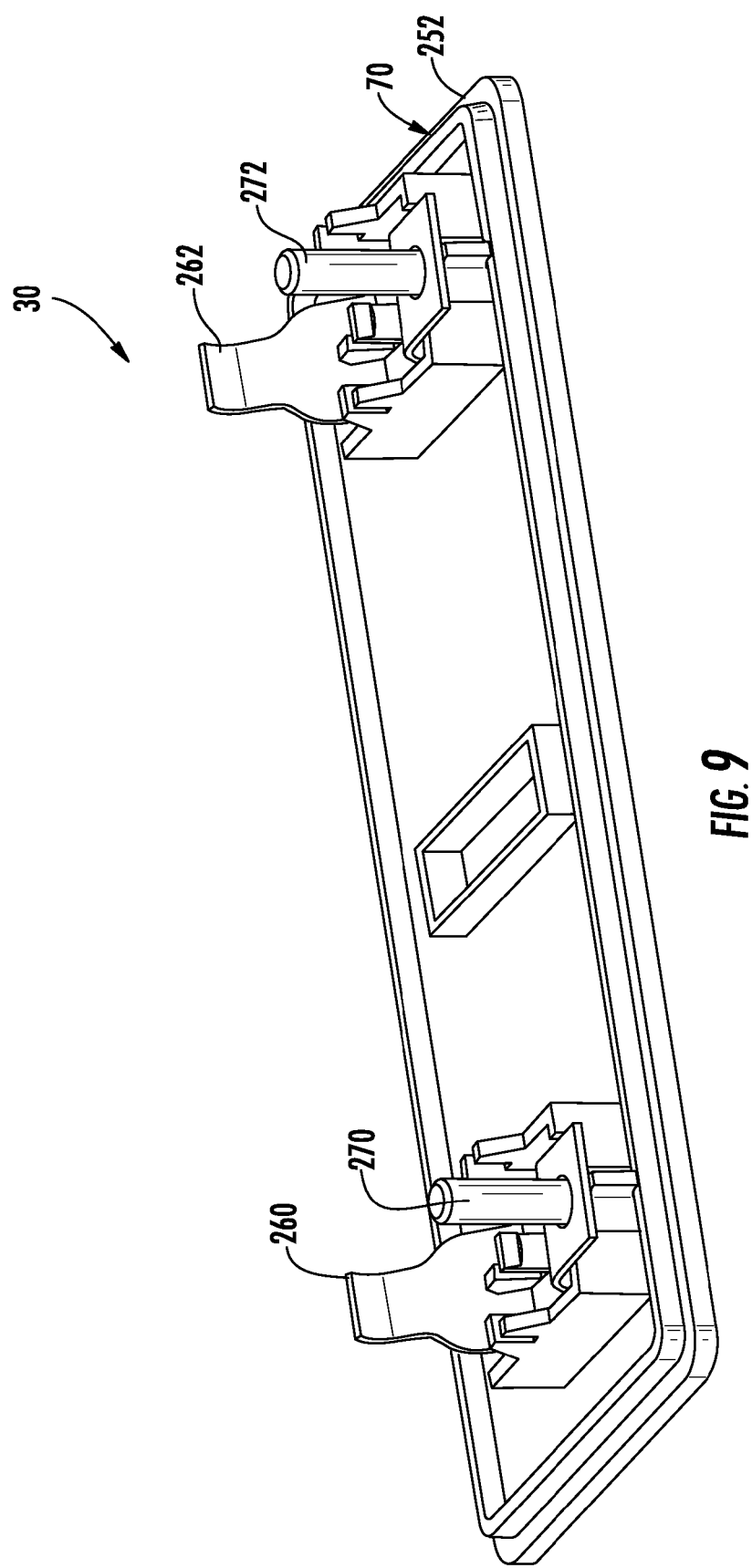
FIG. 9 is a schematic of the base plate of FIG. 8.
Figure 10:
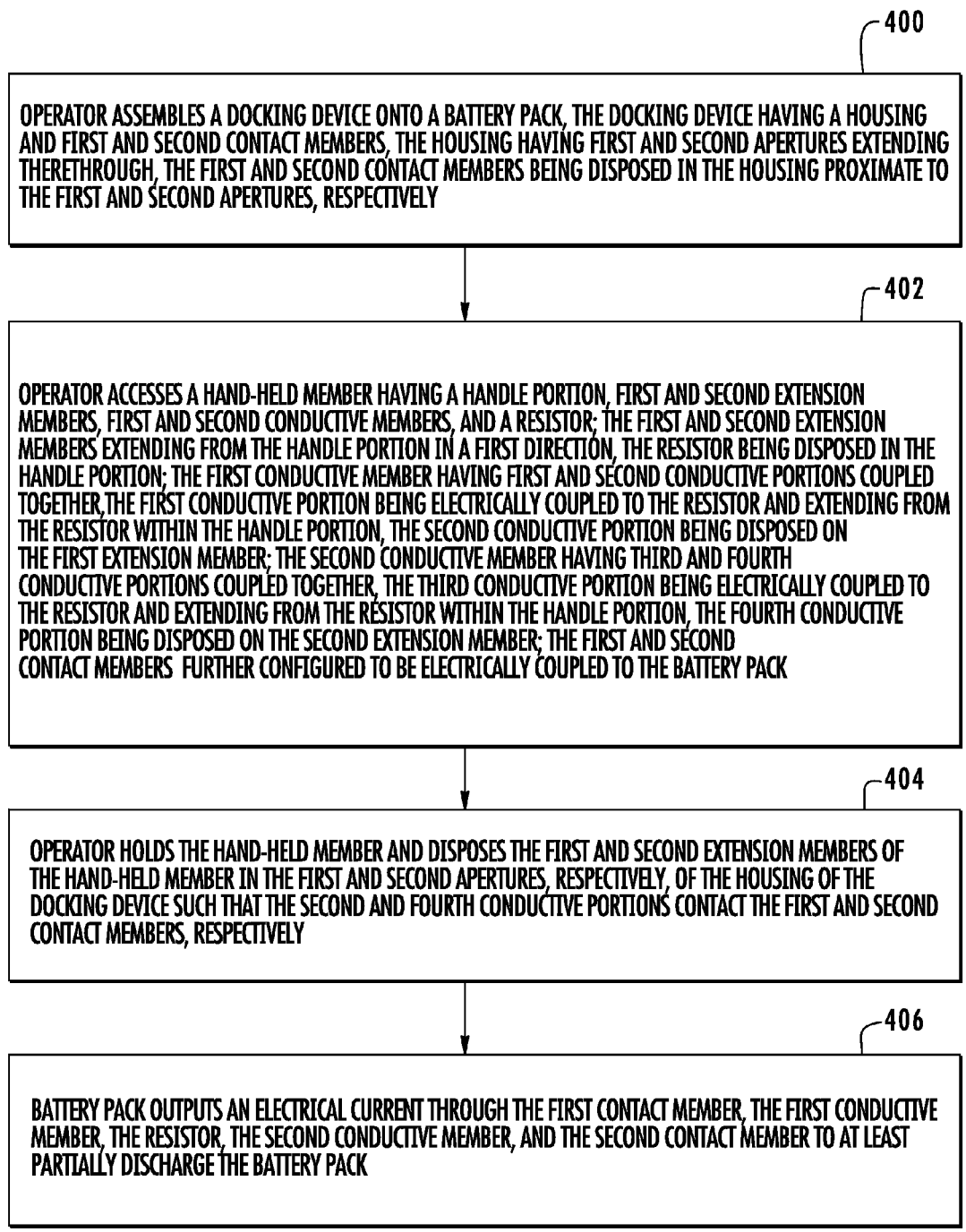
FIG. 10 is a flowchart of a method for discharging a battery pack in accordance with another exemplary embodiment.

Referring to FIGS. 4, 7 and 8, the contact member 260 includes a base portion 320 and a contact portion 322 coupled to one another. The contact member 260 is disposed in the housing 240 proximate to the aperture 290 extending through the housing portion 250. Further, the base portion 320 is coupled to the mounting bracket 310 of the base plate 252. The contact portion 322 extends upwardly from the base portion 320 toward the aperture 290. The contact member 260 is further operably and electrically coupled to the electrical terminal 270. The contact portion 322 is configured to contact the conductive portion 142 of the hand-held member 60 when the extension member 90 is disposed through the aperture 290 of the docking device 70.

The contact member 262 includes a base portion 330 and a contact portion 332 coupled to one another. The contact member 262 is disposed in the housing 240 proximate to the aperture 292 extending through the housing portion 250. Further, the base portion 330 is coupled to the mounting bracket 312 of the base plate 252. The contact portion 332 extends upwardly from the base portion 330 toward the aperture 292. The contact member 262 is further operably and electrically coupled to the electrical terminal 272. The contact portion 332 is configured to contact the conductive portion 152 of the hand-held member 60 when the extension member 100 is disposed through the aperture 292 of the docking device 70.

Referring to FIG. 8, the electrical terminals 270, 272 are coupled to the mounting brackets 310, 312 of the base plate 252. The electrical terminal 270 extends through an aperture in the base portion 320 of the contact member 260 and is electrically coupled to the contact member 260. The electrical terminal 270 threadably receives a nut (not shown) thereon for electrically coupling the electrical terminal 270 to the cable 40 (shown in FIG. 1). The electrical terminal 272 extends through an aperture in the base portion 330 of the contact member 262 and is electrically coupled to the contact member 262. The electrical terminal 272 threadably receives a nut (not shown) thereon for electrically coupling the electrical terminal 272 to the cable 42 (shown in FIG. 1).

Referring to FIGS. 1, 2, 6, 8 and 10, a method for discharging the battery pack 20 utilizing the battery pack discharging device 30 in accordance with another exemplary embodiment will now be explained.

At step 400, an operator assembles the docking device 70 onto the battery pack 20. The docking device 70 has the housing 240 and contact members 260, 262. The housing 240 has apertures 290, 292 extending therethrough. The contact members 260, 262 are disposed in the housing 240 proximate to the apertures 290, 292, respectively.

At step 402, the operator accesses the hand-held member 60 having the handle portion 80, extension members 90, 100, conductive members 106, 107, and the resistor 108. The extension members 90, 100 extend from the handle portion 80 in a first direction. The resistor 108 is disposed in the handle portion 80. The conductive member 106 has conductive portions 140, 142 coupled together. The conductive portion 140 is electrically coupled to the resistor 108 and extends from the resistor 108 within the handle portion. The conductive portion 142 is disposed on the extension member 90. The conductive member 107 has conductive portions 150, 152 coupled together. The conductive portion 150 is electrically coupled to the resistor 108 and extends from the resistor 108 within the handle portion 80. The conductive portion 152 is disposed on the extension member 100. The contact members 260, 262 are further configured to be electrically coupled to the battery pack 20.

At step 404, the operator holds the hand-held member 60 and disposes the extension members 90, 100 of the hand-held member 60 in the apertures 290, 292, respectively, of the housing 240 of the docking device 70 such that the conductive portions 142, 152 contact the contact members 260, 262, respectively.

At step 406, the battery pack 20 outputs an electrical current through the contact member 260, the conductive member 106, the resistor 108, the conductive member 107, and the contact member 262 to at least partially discharge the battery pack 20

The battery pack discharging device and the method for discharging a battery pack provide a substantial advantage over other devices and methods. In particular, the battery pack discharging device and the method provide a technical effect of allowing an operator to insert a hand-held member into a docking device to discharge the battery pack, regardless of an operational state of the internal contactors and/or a fuse within the battery pack.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery pack discharging device, comprising:
a hand-held member having a handle portion, first and second extension members, first and second guide tabs, first and second conductive members and a resistor electrically coupled between the first and second conductive members, the handle portion and the first and second extension members extending from the handle portion in a first direction, the resistor being disposed in the handle portion, the first and second guide tabs extending from the handle portion in the first direction, the first and second guide tabs being disposed proximate to first and second sides, respectively, of the first extension member, the hand-held member having at least one aperture extending therethrough such that airflow through the aperture cools the resistor; and
a docking station having a housing and first and second contact members disposed in the housing, the housing having first and second apertures extending therethrough, the hand-held member configured to be at least partially disposed in the first and second apertures, respectively, of the housing such that the first and second conductive members contact the first and second contact members, respectively, for discharging a battery pack.

2. The battery pack discharging device of claim 1, wherein the battery pack is configured to output an electrical current through the first contact member, the first conductive member, the resistor, the second conductive member, and the second contact member to at least partially discharge the battery pack when the first and second conductive members contact the first and second contact members, respectively.

3. The battery pack discharging device of claim 1, wherein the first conductive member includes first and second conductive portions coupled together, the first conductive portion being electrically coupled to the resistor and extending from the resistor within the handle portion, the second conductive portion being disposed on the first extension member.

4. The battery pack discharging device of claim 3, wherein the second conductive member includes third and fourth conductive portions coupled together, the third conductive portion being electrically coupled to the resistor and extending from the resistor within the handle portion, the fourth conductive portion being disposed on the second extension member.

5. The battery pack discharging device of claim 4, wherein the first and second contact members are disposed in the housing proximate to the first and second apertures, respectively, the first and second contact members further configured to be electrically coupled to the battery pack; and
the first and second extension members of the hand-held member configured to be disposed in the first and second apertures, respectively, of the housing of the docking device such that the second and fourth conductive portions contact the first and second contact members, respectively.

6. The battery pack discharging device of claim 1, further comprising third and fourth guide tabs extending from the handle portion in the first direction, the third and fourth guide tabs being disposed proximate to first and second sides, respectively, of the second extension member.

7. The battery pack discharging device of claim 1, wherein the hand-held member is constructed of an electrically non-conductive material.

8. A battery pack discharging device, comprising:
a hand-held member having a handle portion, first and second extension members, first, second, third, and fourth guide tabs, first and second conductive members, and a resistor; the first and second extension members extending from the handle portion in a first direction; the first and second guide tabs extending from the handle portion in the first direction, the first and second guide tabs being disposed proximate to first and second sides, respectively, of the first extension member, the third and fourth guide tabs extending from the handle portion in the first direction, the third and fourth guide tabs being disposed proximate to first and second sides, respectively, of the second extension member, the resistor being disposed in the handle portion and being electrically coupled between the first and second conductive members; and
a docking station having a housing and first and second contact members disposed in the housing, the housing having first and second apertures extending therethrough, the hand-held member configured to be at least partially disposed in the first and second apertures, respectively, of the housing such that the first and second conductive members contact the first and second contact members, respectively, for discharging a battery pack.

9. The battery pack discharging device of claim 8, wherein the hand-held member further having at least one aperture extending therethrough such that airflow through the aperture cools the resistor.

10. The battery pack discharging device of claim 8, wherein the battery pack is configured to output an electrical current through the first contact member, the first conductive member, the resistor, the second conductive member, and the second contact member to at least partially discharge the battery pack when the first and second conductive members contact the first and second contact members, respectively.

* * * * *